(12) United States Patent
Kasuga et al.

(10) Patent No.: US 7,700,507 B2
(45) Date of Patent: *Apr. 20, 2010

(54) OPTICAL GLASS, PREFORM FOR PRECISION PRESS-MOLDING, PROCESS FOR THE PRODUCTION OF THE PREFORM, OPTICAL ELEMENT, AND PROCESS FOR THE PRODUCTION OF THE ELEMENT

(75) Inventors: Yoshiko Kasuga, Koganei (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 1097 days.

This patent is subject to a terminal disclaimer.

(21) Appl. No.: 11/225,886

(22) Filed: Sep. 14, 2005

(65) Prior Publication Data

US 2006/0079390 A1 Apr. 13, 2006

(30) Foreign Application Priority Data

Sep. 29, 2004 (JP) ............................. 2004-284506

(51) Int. Cl.
*C03C 3/066* (2006.01)
*C03C 3/068* (2006.01)
*C03C 3/095* (2006.01)

(52) U.S. Cl. ................................. 501/78; 501/64; 65/64

(58) Field of Classification Search .................... 501/64, 501/65, 78, 79; 65/64
See application file for complete search history.

(56) References Cited

U.S. PATENT DOCUMENTS

| | | | | |
|---|---|---|---|---|
| 4,469,800 A * | 9/1984 | Boudot et al. | ................... | 501/43 |
| 6,251,813 B1 * | 6/2001 | Sato | ............. | 501/78 |
| 6,713,419 B1 * | 3/2004 | Onozawa et al. | .............. | 501/78 |
| 6,753,281 B2 * | 6/2004 | Uehara | ......................... | 501/78 |
| 6,844,279 B2 * | 1/2005 | Hayashi et al. | ................ | 501/50 |
| 7,138,348 B2 * | 11/2006 | Uehara | ......................... | 501/64 |
| 7,351,675 B2 * | 4/2008 | Kasuga et al. | ................... | 501/78 |
| 2003/0050177 A1 * | 3/2003 | Uehara | ......................... | 501/78 |
| 2003/0125186 A1 * | 7/2003 | Hayashi et al. | ................ | 501/50 |
| 2004/0116272 A1 * | 6/2004 | Uehara | ......................... | 501/78 |
| 2005/0164864 A1 * | 7/2005 | Kasuga et al. | ................... | 501/78 |
| 2008/0026928 A1 * | 1/2008 | Hayashi et al. | ................ | 501/78 |

FOREIGN PATENT DOCUMENTS

| | | |
|---|---|---|
| JP | 58-025607 | 2/1983 |
| JP | 62-100449 | 5/1987 |
| JP | 07-118033 | 5/1995 |
| JP | 08-026765 | 1/1996 |
| JP | 08-259257 | 10/1996 |

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

An optical glass which has an Abbe's number (vd) of 50 to 59, has the property of not easily reacting with a press mold, a low-temperature softening property, excellent glass stability and high refractivity, and is suitable for precision press-molding. The optical glass comprising $B_2O_3$ and $SiO_2$ as essential components and having a $B_2O_3$ and $SiO_2$ total content ($B_2O_3+SiO_2$) of 45 to 70 by mol % and an $SiO_2$ content/$B_2O_3$ content molar ratio ($SiO_2/B_2O_3$) of from 0.1 to 0.5, the optical glass further comprising, by mol %, 5 to 15% of $La_2O_3$, 0.1 to 8% of $Gd_2O_3$, provided that the total content of $La_2O_3$ and $Gd_2O_3$ is 8% or more, 0 to 10% of $Y_2O_3$, 3 to 18% of $Li_2O$, provided that the molar ratio of the content of $Li_2O$ to the total content of $B_2O_3$ and $SiO_2$ [$Li_2O/(B_2O_3+SiO_2)$] is over 0 but not more than 0.2, 0.1 to 15% of ZnO, 2 to 20% of CaO, 0 to 5% of BaO, provided that the content of BaO is smaller than the content of ZnO, 0 to 5% of SrO, 0 to 5% of MgO, provided that the molar ratio of the total content of MgO, CaO, SrO and BaO to the total content of $B_2O_3$ and $SiO_2$ [$(MgO+CaO+SrO+BaO)/(B_2O_3+SiO_2)$] is from 0.1 to 0.4, and 0 to 5% of $ZrO_2$, and having a refractive index (nd) and an Abbe's number (vd) which satisfy the equation (1), $$vd \geq 308.5 - 150 \times nd \text{ (in which } 50 \leq vd \leq 59) \qquad (1).$$

8 Claims, 1 Drawing Sheet

OPTICAL GLASS, PREFORM FOR PRECISION PRESS-MOLDING, PROCESS FOR THE PRODUCTION OF THE PREFORM, OPTICAL ELEMENT, AND PROCESS FOR THE PRODUCTION OF THE ELEMENT

This application is a new U.S. utility application claiming priority to JP 2004-284506, filed 29 Sep. 2004, the entire contents of which is hereby incorporated by reference.

TECHNICAL BACKGROUND

The present invention relates to an optical glass, a preform for precision press-molding ("precision press-molding preform" hereinafter), a process for the production of the preform, an optical element and a process for the production of the element. More specifically, it relates to an optical glass that has an Abbe's number (vd) of 50 to 59 and has a high refractive index and that has excellent glass stability and is suitable for precision press-molding, a precision press-molding preform formed of the above optical glass, a process for the production of the preform, an optical element formed of the above glass and a process for the production of the element.

TECHNICAL BACKGROUND

The process of heating a pre-molded glass material formed of an optical glass, i.e., a preform and precision press-molding the preform with a press mold to produce an optical element such as an aspherical lens, a microlens, a diffraction grating, or the like is called "precision press-molding process" or "mold optics method", and is well known.

There are various optical properties that are required of glasses to be used for the precision press-molding, and one of such properties is that an optical glass has an Abbe's number (vd) of 50 to 59. There has been known a phosphate-based optical glass that is not for precision press-molding but has such optical properties, as is a glass described in JP-A-58-25607.

Meanwhile, when attempts are made to materialize a glass that exhibits an Abbe's number (vd) of 50 to 59 and that is suitable for the precision press-molding, on the basis of such a phosphate-based composition disclosed in JP-A-58-25607, there is caused a problem that a reaction between the glass and the surface of a press mold during precision press-molding damages the surface of the precision press-molded article or causes foaming, or that the glass is melt-sticks to the surface of the press mold.

The precision press-molding method has a characteristic feature in that the molding surface of a press mold is precisely transferred to a glass to form an optical-function surface such as a lens surface precisely by press molding. When the above damage or foaming takes place on the surface of a precision press-molded product, it is required to carry out a surface-removing process such as polishing or the like, and the above characteristic feature of the precision press-molding method is impaired. A glass to be used in the precision press-molding method is hence required to have the property of having no or less reactivity with the molding surface.

In the precision press-molding, further, it is required to set the press-molding temperature at a lower temperature than the temperature employed for general glass press-molding, so that a glass to be used for the precision press-molding is required to have the property of being softened at a low temperature (low temperature softening property). Further, the glass is required to have excellent stability for forming a preform from the glass in a molten state without causing the devitrification thereof. Moreover, it is required to impart the glass with higher refractivity for increasing the added value of the glass as an optical glass.

Therefore, the optical glass, which exhibits an Abbe's number (vd) of 50 to 59 and is suitable for the precision press-molding, is required have the property of having no or less reactivity with a molding surface, the low-temperature softening property, excellent glass stability (devitrification resistance) and high refractivity.

DISCLOSURE OF THE INVENTION

Under the circumstances, it is an object of the present invention to provide an optical glass that has an Abbe's number (vd) of 50 to 59, that has the property of having no or little reactivity with a press mold, the low-temperature softening property, excellent glass stability and high refractivity, and that is suitable for precision press-molding, a precision press-molding preform formed of the above optical glass, a process for the production of the precision press-molding, an optical element formed of the above optical glass and a process for the production of the optical element.

For achieving the above object, the present inventors have made diligent studies, and as a result, it has been found that the object can be achieved by an optical glass having a specific glass composition and having a specific relationship of Abbe's number (vd) and a refractive index (nd), which finding has led to completion of the present invention.

That is, the present invention provides (1) an optical glass comprising $B_2O_3$ and $SiO_2$ as essential components and having a $B_2O_3$ and $SiO_2$ total content ($B_2O_3+SiO_2$) of 45 to 70 by mol % and an $SiO_2$ content/$B_2O_3$ content molar ratio ($SiO_2/B_2O_3$) of from 0.1 to 0.5, the optical glass further comprising, by mol %, 5 to 15% of $La_2O_3$, 0.1 to 8% of $Gd_2O_3$, provided that the total content of $La_2O_3$ and $Gd_2O_3$ is 8% or more, 0 to 10% of $Y_2O_3$, 3 to 18% of $Li_2O$, provided that the molar ratio of the content of $Li_2O$ to the total content of $B_2O_3$ and $SiO_2$ [$Li_2O/(B_2O_3+SiO_2)$] is over 0 but not more than 0.2, 0.1 to 15% of ZnO, 2 to 20% of CaO, 0 to 5% of BaO, provided that the content of BaO is smaller than the content of ZnO, 0 to 5% of SrO, 0 to 5% of MgO, provided that the molar ratio of the total content of MgO, CaO, SrO and BaO to the total content of $B_2O_3$ and $SiO_2$ [(MgO+CaO+SrO+BaO)/($B_2O_3+SiO_2$)] is from 0.1 to 0.4, and 0 to 5% of $ZrO_2$, and having a refractive index (nd) and an Abbe's number (vd) which satisfy the equation (1), $$vd \geq 308.5 - 150 \times nd \text{ (in which } 50 \leq vd \leq 59\text{)} \quad (1)$$

(2) an optical glass as recited in the above (1), which is for precision press-molding, (3) a precision press-molding preform formed of the optical glass recited in the above (2), (4) an optical element formed of the optical glass recited in the above (1) or (2), (5) a process for the production of a precision press-molding preform by shaping a glass gob separated from a flowing molten glass during the cooling of said glass, wherein said molten glass is a molten glass that gives the optical glass recited in the above (2), (6) a process for the production of an optical element by heating and precision press-molding a preform formed of a glass, which comprises heating and precision press-molding the precision press-molding preform recited in the above (3) or a precision press-molding preform produced by the process recited in the above (5), (7) a process for the production of an optical element as recited in the above (6), wherein the preform is introduced into a press mold, said press mold and said preform are heated together and the preform is precision press-molded, and (8) a process for the production of an optical element as recited in the above (6), wherein the preform is pre-heated, introduced into the press mold and precision press-molded.

EFFECT OF THE INVENTION

According to the present invention, there can be provided an optical glass that has an Abbe's number (vd) of 50 to 59, that has high refractivity and excellent glass stability and that is suitable for precision press-molding, a precision press-molding preform formed of the above glass, and an optical element formed of the above glass.

Further, when the above glass having excellent glass stability is used, a precision press-molding preform can be produced directly from a molten glass thereof, so that there can be provided a process for the production of a precision press-molding preform for producing high-quality preforms highly productively.

Further, by using the glass having all of the above properties, there can be provided a process for the production of an optical element for highly productively producing optical elements.

PREFERRED EMBODIMENTS OF THE INVENTION

Figure 1:
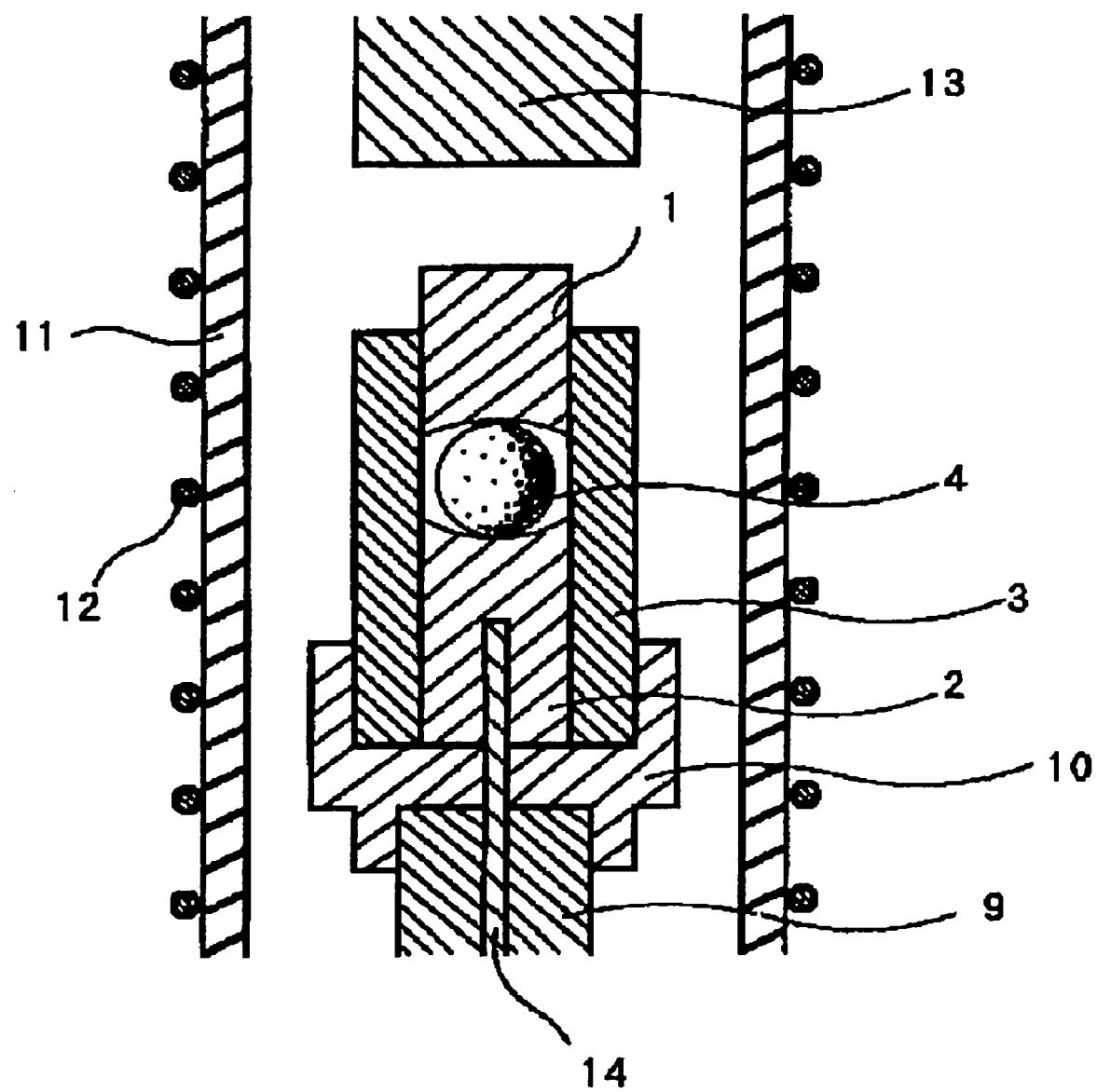
FIG. 1 is a schematic cross-sectional view of a precision press-molding apparatus used in Examples.

The present invention will be explained in the order of the optical glass, the precision press-molding, the process for the production of the preform, the optical element and the process for the production of the optical element.

[Optical Glass]

For materializing a glass that has an Abbe's number (vd) of 50 to 59 and is suitable for precision press-molding, the present inventors have employed, as a starting glass composition, a $B_2O_3$—$SiO_2$-based glass composition containing $B_2O_3$ and $SiO_2$ as a component for constituting a glass network structure, instead of a phosphate-based glass. On the basis of this glass composition, $La_2O_3$ and $Gd_2O_3$ are introduced as essential components. When $La_2O_3$ and $Gd_2O_3$ are caused to be co-present, the glass is improved in stability as compared with a case where one of them is introduced alone. For imparting the glass with the low-temperature softening property and maintaining high refractivity, $Li_2O$ and ZnO are introduced as essential components. Further, when $B_2O_3$, $SiO_2$ and CaO are caused to be co-present, the glass can be imparted with the low-temperature softening property while maintaining the intended optical properties. For the above reasons, as a glass composition for achieving the object of the present invention, a composition having the co-presence of $B_2O_3$, $SiO_2$, $La_2O_3$, $Gd_2O_3$, $Li_2O$, ZnO and CaO is employed as a base, and the contents of components are well balanced, whereby the present invention has been completed.

The optical glass of the present invention comprises $B_2O_3$ and $SiO_2$ as essential components and has a $B_2O_3$ and $SiO_2$ total content ($B_2O_3$+$SiO_2$) of 45 to 70 by mol % and an $SiO_2$ content/$B_2O_3$ content molar ratio ($SiO_2$/$B_2O_3$) of from 0.1 to 0.5, the optical glass further comprising, by mol %, 5 to 15% of $La_2O_3$, 0.1 to 8% of $Gd_2O_3$, provided that the total content of $La_2O_3$ and $Gd_2O_3$ is 8% or more, 0 to 10% of $Y_2O_3$, 3 to 18% of $Li_2O$, provided that the molar ratio of the content of $Li_2O$ to the total content of $B_2O_3$ and $SiO_2$ [$Li_2O$/($B_2O_3$+$SiO_2$)] is over 0 but not more than 0.2, 0.1 to 15% of ZnO, 2 to 20% of CaO, 0 to 5% of BaO, provided that the content of BaO is smaller than the content of ZnO, 0 to 5% of SrO, 0 to 5% of MgO, provided that the molar ratio of the total content of MgO, CaO, SrO and BaO to the total content of $B_2O_3$ and $SiO_2$ [(MgO+CaO+SrO+BaO)/($B_2O_3$+$SiO_2$)] is from 0.1 to 0.4, and 0 to 5% of $ZrO_2$, and having a refractive index (nd) and an Abbe's number (vd) which satisfy the equation (1), $$vd \geq 308.5 - 150 \times nd \text{ (in which } 50 \leq vd \leq 59) \tag{1}$$

[Glass Composition]

Reasons for the limitations of the above ranges of contents of the composition will be explained below. The content of each component, total amounts of components and content ratios will be expressed by mol % or molar ratio hereinafter unless otherwise specified.

$B_2O_3$ is a component for constituting the network structure of the glass and is an essential component for imparting the glass with a low-dispersion property and the low-temperature softening property.

Like $B_2O_3$, $SiO_2$ is a component for constituting the network structure of the glass, and it is also an essential component for improving the glass in durability.

The ranges of contents of $B_2O_3$ and $SiO_2$ are defined on the basis of the total content thereof ($B_2O_3$+$SiO_2$) and the molar ratio thereof ($SiO_2$/$B_2O_3$). When the total content ($B_2O_3$+$SiO_2$) is too small, the glass is degraded in stability and the liquidus temperature increases. When it is too large, the refractive index is decreased, and it is difficult to obtain the intended optical properties. Therefore, the total content ($B_2O_3$+$SiO_2$) is limited to 45 to 70%, preferably, to 50 to 65%. When the molar ratio ($SiO_2$/$B_2O_3$) is too small, the viscosity of the glass is too low when a glass shaped material, for example, a precision press-molding preform is shaped from a molten glass, and the above shaping is difficult. When the above molar ratio is too large, the meltability of the glass is decreased. When the meltability is decreased, it is required to increase the melting temperature of the glass to excess, and a melting vessel (such as a vessel made of a platinum alloy) is corroded, so that corrosions come to be included in a molten glass and degrade the glass in quality. Further, glass components undergo partial volatilization, and the thus-produced glass has a composition deviated from the glass composition that can give the intended optical properties, so that the optical properties such as a refractive index, an Abbe's number, etc., come to be outside the intended values. In view of these points, the molar ratio ($SiO_2$/$B_2O_3$) is limited to 0.1 to 0.5, preferably to 0.14 to 0.45.

Desirably, the total content ($B_2O_3$+$SiO_2$) by weight % is limited to a range of 30 to 50%, preferably, to a range of 33 to 45%. Desirably, further, the weight ratio ($SiO_2$/$B_2O_3$) is limited to a range of 0.1 to 0.45, preferably, to a range of 0.12 to 0.38. The reason therefor is as described hereinabove.

Further, for decreasing the glass transition temperature further and maintaining the durability and acid resistance of the glass under good conditions while imparting the glass with the intended optical properties, it is preferred to limit the content of $B_2O_3$ to a range of 40 to 60%, more preferably, to a range of 42 to 56%.

Further, for maintaining the low-temperature softening property of the glass and improving the glass in durability and stability while imparting the glass with the intended optical properties, it is preferred to limit the content of $SiO_2$ to a range of over 5% to 20% or less, more preferably, to a range of 6 to 18%.

$La_2O_3$ is an essential component not only for improving the glass in durability and weather resistance but also for increasing the refractive index while maintaining the predetermined range of the Abbe's number (vd) thereof. When the above content of $La_2O_3$ exceeds 15%, the Abbe's number (vd) comes to be lower than the lower limit of the intended range, and the thermal stability of the glass may be decreased, so that it is required to limit the above content to 15% or less. Further, when the content of $La_2O_3$ is less than 5%, the glass cannot be imparted with the intended optical properties, and the glass is degraded in weather resistance, so that the content of $La_2O_3$ is limited to the range of 5 to 15%, more preferably, to a range of 6 to 13%.

$Gd_2O_3$ is a component that is used to improve the weather resistance of the glass and to adjust the optical properties of the glass. $Gd_2O_3$ is an essential component that works to improve the glass in stability in co-presence of $La_2O_3$. For obtaining these effects, at least 0.1% of $Gd_2O_3$ is introduced. However, when the content of $Gd_2O_3$ exceeds 8%, the glass is degraded in thermal stability and may be also degraded in the low-temperature softening property, so that the content of $Gd_2O_3$ is limited to a range of 0.1 to 8%, preferably, to a range of 0.1 to 4.0%.

However, for maintaining the excellent weather resistance of the glass and imparting the glass with the optical properties in the predetermined ranges, the total content of $La_2O_3$ and $Gd_2O_3$ ($La_2O_3+Gd_2O_3$) is limited to 8% or more, preferably, to 10% or more.

$Y_2O_3$ is an optional component that is used for improving the weather resistance of the glass and adjusting the optical properties of the glass. When the content of introduced $Y_2O_3$ exceeds 10%, the glass is impaired in thermal stability and the low-temperature softening property, so that the content thereof is limited to 0 to 10%, preferably, to 0 to 8%.

In addition, for further improving the effects produced by the introduction of $La_2O_3$, $Gd_2O_3$ and $Y_2O_3$, the total content of $La_2O_3$, $Gd_2O_3$ and $Y_2O_3$ ($La_2O_3+Gd_2O_3+Y_2O_3$) is preferably adjusted to at least 8%, more preferably, to at least 10%.

$Li_2O$ is an essential component that is introduced for improving the glass in the low-temperature softening property. When the content of $Li_2O$ is less than 3%, the glass transition temperature and sag temperature of the glass are too high, so that the precision press-molding of the glass is difficult. When the content of introduced $Li_2O$ exceeds 18%, the liquidus temperature of the glass is sharply increased, and the weather resistance of the glass is also degraded, so that the content of $Li_2O$ is limited to a range of 3 to 18%, preferably, to a range of 5 to 15%.

However, when the molar ratio of the content of $Li_2O$ to the total content of $B_2O_3$ and $SiO_2$ [$Li_2O/(B_2O_3+SiO_2)$] is large to excess, the glass is degraded in stability, so that the above molar ratio is adjusted to 0.2 or less, preferably, to 0.18 or less. The weight ratio of the content of $Li_2O$ to the total content of $B_2O_3$ and $SiO_2$ is preferably 0.10 or less, more preferably 0.08 or less.

ZnO is a component that is necessary for maintaining the low-temperature softening property and excellent weather resistance of the glass and that can be used for adjusting the stability and durability of the glass. When it is introduced to excess, the Abbe's number (vd) is decreased, so that the content of ZnO is limited to a range of 0.1 to 15%, preferably to a range of 0.1 to 13%.

CaO is a component that is effective for imparting the glass with the low-temperature softening property and maintaining the optical properties in the predetermined ranges when it is in the co-presence of $B_2O_3$ and $SiO_2$. When the content of CaO is less than 2%, the glass is degraded in stability, and no intended optical properties can be obtained. When it is larger than 20%, the glass may be degraded in durability and weather resistance, so that the content of CaO is limited to a range of 2 to 20%, preferably, to a range of 5 to 17%.

BaO is an optional component that is introduced for adjusting the optical properties of the glass. The content of BaO is adjusted to a range smaller than the content of ZnO so that the glass is not degraded in weather resistance and stability. And, the content of BaO is in the range of 0 to 5%, preferably 0 to 4%, more preferably 0 to less than 1%. Still more preferably, BaO is not introduced.

When SrO is introduced in place of BaO, not only the optical properties can be maintained, but also the glass can be improved in durability to a great extent. However, when the content of SrO is larger than 5%, the glass may be degraded in stability, so that the content of SrO is limited to a range of 0 to 5%, preferably, to a range of 0 to 4%.

When MgO is introduced in place of $Li_2O$, MgO can not only produce an effect that the Abbe's number of the glass is increased (formation of lower-dispersion glass), but also can improve the glass in durability to a great extent. However, when the content of MgO exceeds 5%, the glass is degraded in stability, so that the content of MgO is limited to 0 to 5%, preferably, to 0 to 4%.

However, when the molar ratio of the total content of MgO, CaO, SrO and BaO to the total content of $B_2O_3$ and $SiO_2$ [(MgO+CaO+SrO+BaO)/($B_2O_3+SiO_2$)] is too small, it is difficult to impart the glass with the low-temperature softening property, and the Abbe's number (vd) of the glass is decreased (formation of a higher-dispersion glass). When it is too large, the glass stability is impaired. Therefore, the above molar ratio is adjusted to a range of 0.1 to 0.4, preferably to a range of 0.12 to 0.30. In addition, the weight ratio [(MgO+CaO+SrO+BaO)/($B_2O_3+SiO_2$) is adjusted preferably to a range of 0.1 to 0.8, more preferably to a range of 0.1 to 0.5.

For maintaining excellent durability while maintaining the optical properties in the predetermined ranges, the total content of MgO, CaO, SrO, BaO and ZnO (MgO+CaO+SrO+BaO+ZnO) is preferably adjusted to at least 8%, more preferably, to at least 10%.

$ZrO_2$ is a component useful for adjustment of optical constants and improvement of stability. When the content of $ZrO_2$ exceeds 5%, the glass stability is impaired, so that the content of $ZrO_2$ is limited to 0 to 5%, preferably, to 0 to 3%.

In the optical glass of the present invention, $Na_2O$, $K_2O$, etc., may be added in addition to the above components. However, $Na_2O$ and $K_2O$ do not work so effectively as $Li_2O$ to impart the glass with the low-temperature softening property. When they are introduced in such an amount that the above effect can be fully obtained, the refractive index may be decreased, or the glass stability may be impaired, so that the content of each of $Na_2O$ and $K_2O$ is preferably limited to a range of 0 to 2%, more preferably, to a range of 0 to 1%. Still more preferably, the total content of $Na_2O$ and $K_2O$ ($Na_2O+K_2O$) is limited to a range of 0 to 1%.

For further improving the effects produced by the above components, the total content of $B_2O_3$, $SiO_2$, $La_2O_3$, $Gd_2O_3$, $Y_2O_3$, $Li_2O$, ZnO, CaO, BaO, SrO, MgO and $ZrO_2$ is preferably adjusted to at least 98%, more preferably, to at least 99%, still more preferably to 100%.

In the optical glass of the present invention, there may be added 0.1 to 1% by weight, based on the total content of the glass composition, of a generally used refining agent in addition to the above components. As a refining agent, $Sb_2O_3$ is preferred. The content of $Sb_2O_3$ externally added based on the total content of the glass composition is preferably 0 to 1% by weight, more preferably 0 to 0.5% by weight. While $As_2O_3$ is effective as a refining agent, it may damage the molding surface of a press mold, and may cause detrimental effects on environments. It is hence preferred not to add $As_2O_3$ by taking account of these. When detrimental effects on environments are considered, it is also preferred not to introduce compounds Cd, Tl, Pb, etc., into the glass like the arsenic compound. Further, PbO not only causes environmental problems but also causes a problem that it is chemically reduced to be deposited on the glass surface during precision press-molding.

While a small amount of F may be introduced into the above glass, F causes a volatilization-induced problem during the molding of a preform as will be described later, so that it is desirable not to introduce F.

While it is possible to introduce an Hf oxide and Yb oxide, both of these are very expensive. In the glass of the present invention, the above objects can be achieved even without introducing any HF oxide or any Yb oxide, so that it is desirable not to introduce any one of these from the viewpoint that an optical glass is supplied at a stable price and that practice of the glass of the present invention is promoted.

[Optical Properties of the Glass]

The optical properties of the optical glass of the present invention will be explained below. In view of the application aspect of the glass, that is, the design of optical devices, the freedom of design is expanded with an increase in refractive index (nd) when the glass has a constant Abbe's number (vd) number. Therefore, higher-refractivity glasses are desired. From the aspect of the production of a glass, however, when attempts are made to increase a refractive index (nd) while suppressing a decrease in Abbe's number (vd), the stability of the glass is liable to be impaired. As far as a glass having the low-temperature softening property such as the glass of the present invention is concerned, it has been difficult to make the refractive index (nd) higher than a certain value while suppressing a decrease in Abbe's number (vd). In the present invention, the above glass composition is provided, so that the glass is imparted with a refractive index (nd) and an Abbe's number (vd) which satisfy the relationship of the following equation (1) while the Abbe's number (vd) of the glass is in the range of 50 to 59.

$$vd \geq 308.5 - 150 \times nd \quad (1)$$

According to a preferred aspect of the present invention, there can be realized a refractive index (nd) and an Abbe's number (vd) which satisfy the relationship of the following equation (2).

$$vd \geq 309.5 - 150 - nd \quad (2)$$

For maintaining excellent glass stability, it is preferred to adjust the refractive index to 1.74 or less in the ranges of the above optical constants.

[Glass Transition Temperature]

The glass transition temperature (Tg) of the optical glass of the present invention will be explained below. Like the sag temperature (Tg), the glass transition temperature can serve as an index for the low-temperature softening property of the glass. When the glass transition temperature is low, the temperature of the glass during precision press-molding and the temperature of a press mold can be set at low temperatures, and a low glass transition temperature is desirable for extending the lifetime of a press mold and obtaining excellent precision press-molded products.

From the above viewpoint, according to a preferred aspect of the present invention, the optical glass of the present invention has a glass transition temperature (Tg) of 600° C. or lower. According to a more preferred aspect of the present invention, the optical glass of the present invention has a glass transition temperature (Tg) of 580° C. or lower.

While the optical glass of the present invention shall not be limited to a glass for precision press-molding, it has properties suitable for precision press-molding such as the low-temperature softening property, etc., so that it is suitable as an optical glass to be used for precision press-molding.

[Production of Optical Glass]

The process for the production of the optical glass of the present invention will be explained below. First, oxides, carbonates, sulfates, nitrates, fluorides, hydroxides, etc., as raw materials corresponding to components of the glass, such as $H_3BO_3$, $SiO_2$, $La_2O_3$, $Gd_2O_3$, $Y_2O_3$, $Li_2CO_3$, $ZnO$, $CaCO_3$, $ZrO_2$, etc., are weighed, fully mixed to obtain a prepared batch, and the batch is placed in a melting furnace made of a platinum alloy and heated to 1,200 to 1,250° C. While the batch is stirred, it is melted in air until the raw materials are fully melted. Then, the resultant molten glass is refined, fully stirred to homogenize it and shaped, whereby the above optical glass can be obtained. A known apparatus can be used for the above procedures.

[Precision Press-Molding Preform and Process for the Production Thereof]

The precision press-molding preform will be explained below. Characteristically, the precision press-molding preform of the present invention is formed of the above optical glass. The precision press-molding preform (to be sometimes referred to as "preform" hereinafter) refers to a glass shaped material having a weight equivalent to the weight of a precision press-molded product and is a pre-shaped material that is shaped in a form suitable for precision press-molding in advance. Examples of the form of the preform include a sphere, a body of revolution having one axis of symmetry, and the like. The above body of revolution includes bodies of revolution having a smooth contour free of any corner or dent in a cross section including the above axis of symmetry, such as a body of revolution having the contour of an ellipse in which the minor axis is in agreement with the axis of revolution symmetry in the above cross section. Preferably, the body of revolution has the following form. When one of angles formed by a line connecting any point on the contour of a preform in the above cross section to the center of the gravity of the preform on the axis of revolution symmetry and a tangent line contacting the contour on the above point on the contour is taken as θ, and when the above point starts at the axis of revolution symmetry and moves along the contour, the angle θ monotonously increases from 90°, then decreases monotonously and then increases monotonously to come to be 90° at the other point where the contour crosses the axis of revolution symmetry. The preform is heated so as to have a viscosity at which press-molding can be carried out, and then press-molded.

The above preform may have a thin film such as a mold release film on its surface as required. Examples of the mold release film include a carbon-containing film, a self-organized film (self-assembled film), and the like. The above preform can provide an optical element having predetermined optical constants by press-molding.

The above preform can be categorized into a preform of which the entire surface is formed of a free surface, a preform of which the entire surface is formed of a polished surface, a preform of which the entire surface is formed by etching, and the like.

The preform can be produced by the process for the production of a preform, to be explained below, and it can be also produced by applying a machine process such as polishing to a glass shaped material.

The process for the production of a preform will be explained below. The process for the production of a precision press-molding preform, provided by the present invention, is a process for the production of a precision press-molding preform by shaping a glass gob separated from a flowing molten glass during the cooling of said glass, wherein said molten glass is an optical glass that gives the optical glass of the present invention.

The above process had an advantage that it does not require machine processes such as cutting, grinding, polishing, and the like. In a preform to which the machine process is applied, it is required to carry out annealing before the machine process in order to decrease a strain of the glass to such an extent that the glass is not broken. However, the above process for the production of a preform requires no annealing for preventing the breaking. Further, a preform having a smooth surface can be shaped. Further, the entire surface of the preform is a surface formed by solidification of a glass in a molten state, so that the surface neither has any fine scratch caused by polishing nor any latent scratch. In addition to the chemical durability and weather resistance that the glass per se has, the preform has a smooth surface, so that the surface area of the preform is small as compared with a preform having a scratched surface. When the preform is placed in atmosphere, therefore, the surface of the preform does not easily undergo alteration, so that a clean surface state obtained immediately after its formation can be maintained for a long period of time.

In the above process for the production of a preform, further, it is preferred to shape the preform in a floating state produced by application of air pressure, from the viewpoint that the preform is imparted with a smooth and clean surface. When the molten glass is separated in the above production process, if the molten glass is cut and separated with a cutting blade, there is formed a cutting mark called a shear mark. When the shear mark of the preform remains in a precision press-molded product, it constitutes a defect, so that separation free from the shear mark is desirable. The method of separating a molten glass so as not to form any shear mark without using any cutting blade includes a method in which a molten glass is caused to drop from a flow pipe and a method in which the forward end of a molten glass flow flowing out of a flow pipe is supported and the support is removed at a time when a molten glass gob having a predetermined weight can be separated (to be referred to as "descent cutting method" hereinafter). In the descent cutting method, a glass is separated at a narrow portion generated between the forward end side and the flow pipe side of the molten glass flow, whereby a molten glass gob having a predetermined weight can be obtained. Then, the thus-obtained molten glass gob is shaped into a form suitable for press molding while it is in a softened state, whereby a preform can be obtained.

In the above process for the production of a preform, a molten glass gob having a weight equivalent to the weight of one preform is separated, and the preform is formed while the glass gob is in a high-temperature state equivalent to, or higher than, the softening point of the glass.

In addition, when a preform is produced not according to the production process of the present invention but by a machine process, there may be employed a method in which the molten glass is cast into a mold to form a glass shaped material (e.g., a plate-shaped glass) formed of the above optical glass and a machine process is applied to the glass shaped material to form a preform having a predetermined weight. As is described already, it is preferred to fully carry out strain-removing treatment by annealing the glass before the application of the machine process so that the glass is not broken.

[Process for the Production of Optical Element]

The optical element of the present invention is formed of the above optical glass. According to the present invention, the glass constituting the optical element is the above optical glass, so that the optical element has the optical properties (refractive index (nd), Abbe's number (vd), etc.) of the above optical glass, and there can be provided an optical element having predetermined optical constants.

Examples of the optical element of the present invention include various lenses such as a spherical lens, an aspherical lens, a microlens, etc., a diffraction grating, a lens with a diffraction grating, a lens array, a prism, and the like.

The above optical element may be provided with an optical thin film such as an anti-reflection film, a total reflection film, a partial reflection film, a film having spectral properties, or the like, as required.

The process for the production of an optical lens will be explained below.

The process for the production of an optical element, provided by the present invention, is a process for the production of an optical element by heating and precision press-molding a preform formed of a glass, which comprises heating and precision press-molding the above precision press-molding preform or a precision press-molding preform produced by the above production process.

The precision press-molding process is called the mold optics method and is well known in the field of art to which the present invention pertains.

In the optical element, the surface that transmits, refracts, diffracts or reflects light is called an optical-function surface. For example, when the optical element is a lens, a lens surface such as the aspherical surface of an aspherical lens or a spherical surface of a spherical lens corresponds to the optical-function surface. The precision press-molding method is a method in which the molding surface of a press mold is precisely transferred to a glass thereby to form the optical-function surface by press molding. That is, it is not required to apply machine processes such as grinding, polishing, etc., for finishing the optical-function surface of the optical element.

The process of the present invention is therefore suitable for producing optical elements such as a lens, a lens array, a diffraction grating, a prism, and the like, and is particularly optimum for producing aspherical lenses highly productively.

According to the process for the production of an optical element, provided by the present invention, an optical element having the above optical properties can be produced. Further, the glass transition temperature (Tg) of the glass constituting the preform is low, and the preform can be pressed at a relatively low temperature in the way of press-molding a glass. Further, the glass constituting the preform has high stability, so that the devitrification of the glass can be effectively prevented in the steps of re-heating and pressing. Furthermore, a series of steps from melting of the glass up to obtainment of a final product can be highly productively carried out.

The press mold for use in the precision press-molding method can be selected from known molds such as a mold obtained by providing a mold release film to the molding surface of a mold material made of a silicon carbide, an ultrahard material, stainless steel, or the like, while a press mold made of silicon carbide is preferred. The mold release film can be selected from a carbon-containing film, a noble metal alloy film, or the like, while a carbon-containing film is preferred in view of a cost, and the like.

In the precision press-molding method, it is desirable to employ a non-oxidizing gas atmosphere during molding for maintaining the molding surface of the press mold in an excellent state. The non-oxidizing gas is preferably selected from nitrogen or a gas mixture of nitrogen with hydrogen.

The precision press-molding method particularly suitable for the process for the production of an optical element in the present invention will be explained below.

[Precision Press-Molding Method 1]

This method comprises introducing the above preform into a press mold, heating the above press mold and the above preform together and precision press-molding the preform (to be referred to as "precision press-molding method 1" hereinafter).

In the precision press-molding 1, preferably, the precision press-molding is carried out by heating the press mold and the above preform together to a temperature at which the glass constituting the preform exhibits a viscosity of $10^6$ to $10^{12}$ dPa·s.

Further, desirably, the press mold and a precision press-molded product are taken out of the press mold after they are cooled to a temperature at which the above glass exhibits a viscosity of $10^{12}$ dPa·s or higher, more preferably $10^{14}$ dPa·s or higher, still more preferably $10^{16}$ dPa·s.

Under the above conditions, not only the form of the molding surface of the press mold can be more precisely transferred to the glass, but also the precision press-molded product can be taken out without causing any deformation.

[Precision Press-Molding Method 2]

This method comprises introducing a pre-heated preform into a press mold and precision press-molding the preform (to be referred to as "precision press-molding method 2" hereinafter).

According to the above method, the above preform is heated prior to the introduction of the preform into the press mold, so that the cycle time can be decreased, and at the same time an optical element being free of a surface defect and having an excellent surface accuracy can be produced.

Preferably, the temperature for pre-heating the press mold is set at a temperature lower than the temperature for pre-heating the preform. The temperature for pre-heating the press mold is set at a lower temperature in this manner, so that the abrasion of the above mold can be decreased.

In the precision press-molding method 2, desirably, the above preform is pre-heated to a temperature at which the glass constituting the preform exhibits a viscosity of $10^9$ dPa·s or less, more preferably $10^6$ to $10^8$ dPa·s.

Further, it is preferred to pre-heat the above preform while it is caused to float. Further, desirably, the above preform is pre-heated to a temperature at which the glass constituting the preform exhibits a viscosity of $10^{5.5}$ to $10^9$ dPa·s, more preferably $10^6$ to $10^8$ dPa·s.

Preferably, the cooling of the glass is initiated simultaneously with the initiation of the pressing or during the pressing.

The temperature of the press mold is set at a temperature lower than the temperature for preheating the above preform, and a temperature at which the above glass exhibits a viscosity of $10^9$ to $10^{12}$ dPa·s can be used as a cursory standard.

In the above method, preferably, the precision press-molded product is taken out of the mold after it is cooled to a temperature at which the above glass exhibits a viscosity of $10^{12}$ dPa·s or more.

An optical element obtained by the precision press-molding is taken out of the press mold, and it is gradually cooled as required. When the molded product is an optical element such as a lens, or the like, the surface of the optical element may be provided with an optical thin film as required.

Since the optical glass of the present invention is excellent in chemical durability as described already, an altered layer is not easily formed on its surface by a polishing process. When the optical glass of the present invention is used, therefore, a preform can be also produced by a polishing process, and an optical element such as a lens can be produced from this preform by precision press-molding. Further, optical elements such as a spherical lens, an aspherical lens, etc., can be produced by polishing the glass without applying the precision press-molding.

EXAMPLES

The present invention will be explained more in detail with reference to Examples, while the present invention shall not be limited by these Examples.

Examples 1-11

Oxides, carbonates, sulfates, nitrates, fluorides, hydroxides, etc., as raw materials corresponding to components of the glass, such as $H_3BO_3$, $SiO_2$, $La_2O_3$, $Gd_2O_3$, $Y_2O_3$, $Li_2CO_3$, ZnO, $CaCO_3$, $ZrO_2$, etc., were weighed so as to obtain a composition having a predetermined weight of 250 to 300 g each as shown in Tables 1 and 2 and fully mixed to obtain a prepared batch, and the batch was placed in a platinum crucible and melted in air with stirring at 1,200 to 1,250° C. for 2 to 4 hours. After melted, a molten glass was cast into a 40×70×15 mm mold made from carbon and gradually cooled to its glass transition temperature. Immediately thereafter, the glass was placed in an annealing furnace and annealed at the glass transition temperature for approximately 1 hour, and in the furnace, the annealed glass was allowed to cool to room temperature.

Each of the thus-obtained optical glasses was measured for various properties according to the following methods. In these optical glasses, there was precipitated no crystal that was observable through an optical microscope.

(1) Refractive Index (nd) and Abbe's Number (vd)

Optical glasses obtained by setting the gradually cooling temperature at −30° C./hour were measured.

(2) Specific Gravity

Measured according to an Archimedean method.

(3) Glass Transition Temperature (Tg) and Sag Temperature (Ts)

Measured with a thermomechanical analyzer supplied by Rigaku Corporation at a temperature elevation rate of 4° C./minute.

(4) Liquidus Temperature (LT)

A sample was placed in a devitrification testing furnace, maintained at 1,000° C. for 1 hour and then observed for a crystal through a microscope of 10 to 50 magnifications. When the above crystal was not observed, it was considered that the sample had a liquidus temperature of less than 1,000° C.

(5) Viscosity of Glass

A sample was measured for a viscosity at its liquidus temperature by a rotating-cylinder method on the basis of "JIS Z8803-1991 "Viscosity of Liquid—Measurement Method, 8. Viscosity Measurement based on Single Rotating Cylinder Viscometer".

In the above manner, there were obtained optical glasses having predetermined optical constants, having a low-temperature softening property represented by a glass transition temperature (Tg) of 600° C. or lower and a sag temperature (Ts) of 640° C. or lower, having high glass stability represented by a liquidus temperature of less than 1,000° C., having a low specific gravity of less than 3.9, and having a viscosity, measured at 990° C., of at least 2 dPa·s and a viscosity, measured at 1,000° C., of at least 2 dPa·s.

As described above, the glasses obtained in Examples 1 to 11 have the low-temperature softening property suitable for precision press-molding, excellent glass stability in a high-temperature region suitable for shaping a preform directly from a molten glass, excellent shapeability in the above high-temperature region and a low specific gravity that serves to decrease the weight of an optical element.

Comparative Examples 1 and 2

Tables 1 and 2 show compositions of Comparative Examples 1 and 2. A glass in Comparative Example 1 contained no $Gd_2O_3$. When the glass in Comparative Example 1 was maintained at 1,000° C. for measuring its liquidus temperature, the entire glass was devitrified. Table 3 shows properties of the glass of Comparative Example 1.

A glass in Comparative Example 2 had an excess content of BaO. While the glass raw materials were melted and stirred, a crystal was deposited, and no proper glass was obtained.

TABLE 1

| | | \multicolumn{12}{c}{Glass composition} | |
|---|---|---|---|---|---|---|---|---|---|---|---|---|---|---|
| | | $B_2O_3$ | $SiO_2$ | $La_2O_3$ | $Gd_2O_3$ | $Y_2O_3$ | $ZrO_2$ | MgO | CaO | SrO | BaO | ZnO | $Li_2O$ | Total |
| Ex. 1 | mol % | 50.00 | 13.00 | 9.00 | 2.00 | 4.00 | 0.00 | 0.00 | 10.00 | 0.00 | 0.00 | 4.00 | 8.00 | 100.00 |
| | Wt. % | 34.99 | 7.85 | 29.48 | 7.29 | 9.08 | 0.00 | 0.00 | 5.64 | 0.00 | 0.00 | 3.27 | 2.40 | 100.00 |
| Ex. 2 | mol % | 40.00 | 12.00 | 8.00 | 1.00 | 4.00 | 2.00 | 0.00 | 12.00 | 0.00 | 0.00 | 12.00 | 9.00 | 100.00 |
| | Wt. % | 29.18 | 7.56 | 27.31 | 3.80 | 9.46 | 2.58 | 0.00 | 7.05 | 0.00 | 0.00 | 10.23 | 2.82 | 100.00 |
| Ex. 3 | mol % | 55.00 | 8.00 | 9.00 | 2.00 | 4.00 | 0.00 | 0.00 | 11.00 | 0.00 | 0.00 | 2.00 | 9.00 | 100.00 |
| | Wt. % | 38.60 | 4.85 | 29.56 | 7.31 | 9.11 | 0.00 | 0.00 | 6.22 | 0.00 | 0.00 | 1.64 | 2.71 | 100.00 |
| Ex. 4 | mol % | 50.00 | 13.00 | 9.00 | 2.00 | 4.00 | 0.00 | 0.00 | 9.00 | 2.00 | 0.00 | 2.00 | 9.00 | 100.00 |
| | Wt. % | 34.93 | 7.84 | 29.42 | 7.27 | 9.06 | 0.00 | 0.00 | 5.06 | 2.08 | 0.00 | 1.63 | 2.70 | 100.00 |
| Ex. 5 | mol % | 47.00 | 13.00 | 9.00 | 1.00 | 4.00 | 0.00 | 0.00 | 11.00 | 0.00 | 0.00 | 5.00 | 10.00 | 100.00 |
| | Wt. % | 34.18 | 8.16 | 30.63 | 3.79 | 9.43 | 0.00 | 0.00 | 6.44 | 0.00 | 0.00 | 4.25 | 3.12 | 100.00 |
| Ex. 6 | mol % | 47.00 | 13.00 | 9.00 | 1.00 | 4.00 | 0.00 | 0.00 | 11.00 | 0.00 | 0.00 | 5.00 | 10.00 | 100.00 |
| | Wt. % | 34.18 | 8.16 | 30.63 | 3.79 | 9.43 | 0.00 | 0.00 | 6.44 | 0.00 | 0.00 | 4.25 | 3.12 | 100.00 |
| Ex. 7 | mol % | 50.00 | 13.00 | 9.00 | 1.00 | 4.00 | 1.00 | 2.00 | 7.00 | 2.00 | 0.00 | 2.00 | 9.00 | 100.00 |
| | Wt. % | 35.90 | 8.06 | 30.24 | 3.74 | 9.32 | 1.27 | 0.83 | 4.05 | 2.14 | 0.00 | 1.68 | 2.77 | 100.00 |
| Ex. 8 | mol % | 40.00 | 12.00 | 8.00 | 1.00 | 4.00 | 2.00 | 0.00 | 14.00 | 0.00 | 0.00 | 10.00 | 9.00 | 100.00 |
| | Wt. % | 29.34 | 7.60 | 27.46 | 3.82 | 9.52 | 2.60 | 0.00 | 8.27 | 0.00 | 0.00 | 8.57 | 2.83 | 100.00 |
| Ex. 9 | mol % | 50.00 | 13.00 | 9.00 | 2.00 | 4.00 | 0.00 | 0.00 | 9.00 | 0.00 | 0.00 | 4.00 | 9.00 | 100.00 |
| | Wt. % | 35.08 | 7.87 | 29.55 | 7.31 | 9.10 | 0.00 | 0.00 | 5.09 | 0.00 | 0.00 | 3.28 | 2.71 | 100.00 |
| Ex. 10 | mol % | 50.00 | 12.00 | 9.00 | 2.00 | 4.00 | 0.00 | 0.00 | 9.00 | 2.00 | 0.00 | 3.00 | 9.00 | 100.00 |
| | Wt. % | 34.85 | 7.22 | 29.36 | 7.26 | 9.04 | 0.00 | 0.00 | 5.05 | 2.07 | 0.00 | 2.44 | 2.69 | 100.00 |
| Ex. 11 | mol % | 48.00 | 13.00 | 9.00 | 1.00 | 4.00 | 0.00 | 0.00 | 10.00 | 0.00 | 0.00 | 5.00 | 10.00 | 100.00 |
| | Wt. % | 34.86 | 8.15 | 30.58 | 3.78 | 9.42 | 0.00 | 0.00 | 5.85 | 0.00 | 0.00 | 4.24 | 3.12 | 100.00 |
| CEx. 1 | mol % | 50.00 | 13.00 | 11.00 | 0.00 | 4.00 | 0.00 | 0.00 | 9.00 | 2.00 | 0.00 | 2.00 | 9.00 | 100.00 |
| | Wt. % | 35.19 | 7.90 | 36.23 | 0.00 | 9.13 | 0.00 | 0.00 | 5.10 | 2.09 | 0.00 | 1.65 | 2.72 | 100.00 |
| CEx. 2 | mol % | 45.00 | 13.00 | 10.00 | 4.00 | 0.00 | 0.00 | 2.00 | 12.00 | 0.00 | 6.00 | 0.00 | 8.00 | 100.00 |
| | Wt. % | 29.74 | 7.41 | 30.93 | 13.76 | 0.00 | 0.00 | 0.77 | 6.39 | 0.00 | 8.73 | 0.00 | 2.27 | 100.00 |

Ex. = Example,
CEx. = Comparative Example

TABLE 2

| | | \multicolumn{6}{c}{Glass composition} |
|---|---|---|---|---|---|---|---|
| | | $SiO_2 + B_2O_3$ (%) | $SiO_2/B_2O_3$ (ratio) | $La_2O_3 + Gd_2O_3$ (%) | $RO/(SiO_2 + B_2O_3)$ (ratio) | $R'O/(SiO_2 + B_2O_3)$ (ratio) | $Li2O/(SiO2 + B2O3)$ (ratio) |
| Ex. 1 | mol | 63.00 | 0.26 | 11.00 | 0.16 | 0.22 | 0.13 |
| | weight | 42.84 | 0.22 | 36.76 | 0.06 | 0.21 | 0.13 |
| Ex. 2 | mol | 52.00 | 0.30 | 9.00 | 0.23 | 0.46 | 0.17 |
| | weight | 36.74 | 0.26 | 31.11 | 0.08 | 0.47 | 0.19 |
| Ex. 3 | mol | 63.00 | 0.15 | 11.00 | 0.17 | 0.21 | 0.14 |
| | weight | 43.45 | 0.13 | 36.87 | 0.06 | 0.18 | 0.14 |
| Ex. 4 | mol | 63.00 | 0.26 | 11.00 | 0.17 | 0.21 | 0.14 |
| | weight | 42.77 | 0.22 | 36.70 | 0.06 | 0.21 | 0.17 |
| Ex. 5 | mol | 60.00 | 0.28 | 10.00 | 0.18 | 0.27 | 0.17 |
| | weight | 42.34 | 0.24 | 34.41 | 0.07 | 0.25 | 0.15 |
| Ex. 6 | mol | 60.00 | 0.28 | 10.00 | 0.18 | 0.27 | 0.17 |
| | weight | 42.34 | 0.24 | 34.41 | 0.07 | 0.25 | 0.15 |
| Ex. 7 | mol | 63.00 | 0.26 | 10.00 | 0.17 | 0.21 | 0.14 |
| | weight | 43.96 | 0.22 | 33.98 | 0.06 | 0.20 | 0.16 |
| Ex. 8 | mol | 52.00 | 0.30 | 9.00 | 0.27 | 0.46 | 0.17 |
| | weight | 36.93 | 0.26 | 31.28 | 0.08 | 0.46 | 0.22 |
| Ex. 9 | mol | 63.00 | 0.26 | 11.00 | 0.14 | 0.21 | 0.14 |
| | weight | 42.96 | 0.22 | 36.86 | 0.06 | 0.19 | 0.12 |
| Ex. 10 | mol | 62.00 | 0.24 | 11.00 | 0.18 | 0.23 | 0.15 |
| | weight | 42.07 | 0.21 | 36.62 | 0.06 | 0.23 | 0.17 |
| Ex. 11 | mol | 61.00 | 0.27 | 10.00 | 0.16 | 0.25 | 0.16 |
| | weight | 43.00 | 0.23 | 34.37 | 0.07 | 0.23 | 0.14 |

TABLE 2-continued

| | | Glass composition | | | | | |
|---|---|---|---|---|---|---|---|
| | | $SiO_2 + B_2O_3$ (%) | $SiO_2/B_2O_3$ (ratio) | $La_2O_3 + Gd_2O_3$ (%) | $RO/(SiO_2 + B_2O_3)$ (ratio) | $R'O/(SiO_2 + B_2O_3)$ (ratio) | $Li_2O/(SiO2 + B2O3)$ (ratio) |
| CEx. 1 | mol | 63.00 | 0.26 | 11.00 | 0.17 | 0.21 | 0.14 |
| | weight | 43.08 | 0.22 | 36.23 | 0.06 | 0.21 | 0.17 |
| CEx. 2 | mol | 58.00 | 0.29 | 14.00 | 0.34 | 0.34 | 0.14 |
| | weight | 37.15 | 0.25 | 44.69 | 0.06 | 0.43 | 0.43 |

Ex. = Example,
CEx. = Comparative Example
RO = MgO + CaO + SrO + BaO
R'O = MgO + CaO + SrO + BaO + ZnO

TABLE 3

| | | | Properties of optical glass | | | | |
|---|---|---|---|---|---|---|---|
| | nd | vd | Specific gravity | Tg (° C.) | Ts (° C.) | Liquidus Temperature | Viscosity at 990° C. (dPa·s) | Viscosity at 1000° C. (dPa·s) |
| Ex. 1 | 1.69822 | 55.40 | 3.696 | 571 | 616 | Less than 1000° C. | 9 | 7 |
| Ex. 2 | 1.71603 | 52.34 | 3.787 | 530 | 575 | Less than 1000° C. | 7 | 6 |
| Ex. 3 | 1.69580 | 56.07 | 3.653 | 572 | 620 | Less than 1000° C. | 3 | 3 |
| Ex. 4 | 1.69623 | 55.97 | 3.688 | 568 | 611 | Less than 1000° C. | 7 | 6 |
| Ex. 5 | 1.69701 | 55.19 | 3.630 | 551 | 595 | Less than 1000° C. | 6 | 5 |
| Ex. 6 | 1.69701 | 55.19 | 3.630 | 551 | 595 | Less than 1000° C. | 6 | 5 |
| Ex. 7 | 1.69278 | 55.69 | 3.615 | 565 | 609 | Less than 1000° C. | 7 | 5 |
| Ex. 8 | 1.71481 | 52.48 | 3.783 | 525 | 572 | Less than | 7 | 6 |
| Ex. 9 | 1.69632 | 55.62 | 3.634 | 565 | 610 | Less than 1000° C. | 7 | 6 |
| Ex. 10 | 1.69745 | 55.75 | 3.700 | 564 | 607 | Less than 1000° C. | 6 | 5 |
| Ex. 11 | 1.69517 | 55.44 | 3.612 | 552 | 599 | Less than 1000° C. | 6 | 5 |
| CEx. 1 | 1.69842 | 55.74 | 3.646 | 566 | 611 | Devitrified | 7 | 6 |
| CEx. 2 | — | — | — | — | — | — | — | — |

Ex. = Example,
CEx. = Comparative Example

Example 12

Each of refined and homogenized glasses that were to give the glasses of Examples 1 to 11 was caused to flow at a constant rate out of a pipe formed of a platinum alloy which was temperature-adjusted to a temperature region in which the glass was stably flowable without undergoing devitrification, and a molten glass gob having a weight of a preform as an end product was separated by a dropping method or a descent-cutting method. The molten glass gob was received with a receiving mold having a gas-ejecting port in its bottom, and a preform was formed while the glass gob was caused to float by ejecting a gas from the gas-ejecting port. The timing of separation of the molten glass was adjusted and set to give spherical preforms having a diameter of 2 to 30 mm. The weights of the preforms were precisely in agreement with the corresponding set values, and all of the preforms had smooth surfaces.

Each of the thus-obtained preforms was precision press-molded with a press apparatus shown in FIG. 1, to obtain aspherical lenses. Specifically, the preform was placed between a lower mold member 2 and an upper mold member 1 which constituted a press mold, then, the atmosphere in a quartz tube 11 was replaced with a nitrogen atmosphere, and a heater 12 is electrically powered to heat the inside of the quartz tube 11. The temperature inside the press mold was set at a temperature at which the glass to be molded exhibited a viscosity of $10^8$ to $10^{10}$ dPa·s, and while this temperature was maintained, a pressing rod 13 was caused to move downward. The upper mold 1 was thereby pressed to press the preform 4 set in the mold. The pressing was carried out at a pressure of 8 MPa for 30 seconds. After the pressing, the pressure of the pressing was released, and while a glass molded product was in contact with the lower mold member 2 and the upper mold member 2, the glass molded product was gradually cooled to a temperature at which the above glass exhibited a viscosity of at least $10^{12}$ dPa·s. Then, the glass molded product was rapidly cooled to room temperature and taken out of the mold to give an aspherical lens. The aspherical lenses obtained in the above manner were lenses having remarkably high surface accuracy. In FIG. 1, reference numeral 3 indicates a sleeve, numeral 9 indicates a support rod, numeral 10 indicates a support base, and numeral 14 indicates a thermocouple.

The aspherical lenses obtained by precision press-molding may be provided each with an anti-reflection film as required.

Then, similar preforms were precision press-molded by other method. In this method, while a preform was caused to float, the preform was pre-heated to a temperature at which a glass constituting the preform exhibited a viscosity of $10^8$ dPa·s. Separately, a press mold having an upper mold member, a lower mold member and a sleeve member was heated up to a temperature at which the above glass exhibited a viscosity of $10^9$ to $10^{12}$ dPa·s, and the pre-heated preform was introduced into the cavity of the press mold to carry out precision press-molding of the preform. The pressure of the pressing was set at 10 MPa. Upon the initiation of the pressing, the glass and the press mold were cooled together and continued to be cooled until the molded glass had a viscosity of at least $10^{12}$ dPa·s, and then the molded product was taken out of the mold to give an aspherical lens. The aspherical lenses obtained in the above manner were lenses having remarkably high surface accuracy.

The aspherical lenses obtained by precision press-molding may be provided each with an anti-reflection film as required.

INDUSTRIAL UTILITY

The optical glass of the present invention has an Abbe's number (vd) of 50 to 59 and has the property of not easily reacting with a press mold, a low-temperature softening property, excellent glass stability and high refractivity, and it is suitable for precision press-molding. When it is used, precision press-molding preforms and optical elements can be highly productively provided.

The invention claimed is:

1. An optical glass comprising $B_2O_3$ and $SiO_2$ as essential components and having a $B_2O_3$ and $SiO_2$ total content ($B_2O_3+SiO_2$) of 45 to 70 by mol % and an $SiO_2$ content/$B_2O_3$ content molar ratio ($SiO_2/B_2O_3$) of from 0.1 to 0.5, the optical glass further comprising, by mol %, 5 to 15% of $La_2O_3$, 0.1 to 8% of $Gd_2O_3$, provided that the total content of $La_2O_3$ and $Gd_2O_3$ is 8% or more, 0 to 10% of $Y_2O_3$, 3 to 18% of $Li_2O$, provided that the molar ratio of the content of $Li_2O$ to the total content of $B_2O_3$ and $SiO_2$ [$Li_2O/(B_2O_3+SiO_2)$] is over 0 but not more than 0.2, 0.1 to 15% of ZnO, 2 to 20% of CaO, 0 to 5% of BaO, provided that the content of BaO is smaller than the content of ZnO, 0 to 5% of SrO, 0 to 5% of MgO, provided that the molar ratio of the total content of MgO, CaO, SrO and BaO to the total content of $B_2O_3$ and $SiO_2$ [(MgO+CaO+SrO+BaO)/($B_2O_3+SiO_2$)] is from 0.1 to 0.4, and 0 to 5% of $ZrO_2$, and having a refractive index (nd) of 1.71603 or less, the refractive index and an Abbe's number (vd) which satisfy the equation (1), $$vd \geq 308.5 - 150 \times nd \text{ (in which } 50 \leq vd \leq 59\text{)} \quad (1).$$

2. The optical glass as recited in claim 1, which is for precision press-molding.

3. A precision press-molding preform formed of the optical glass recited in claim 2.

4. An optical element formed of the optical glass recited in claim 1.

5. A process for the production of a precision press-molding preform by shaping a glass gob separated from a flowing molten glass during the cooling of said glass, wherein said molten glass is a molten glass that gives the optical glass recited in claim 2.

6. A process for the production of an optical element by heating and precision press-molding a preform formed of a glass, which comprises heating and precision press-molding the precision press-molding preform recited in claim 3.

7. The process for the production of an optical element as recited in claim 6, wherein the preform is introduced into a press mold, said press mold and said preform are heated together and the preform is precision press-molded.

8. A process for the production of an optical element as recited in claim 6, wherein the preform is pre-heated, introduced into the press mold and precision press-molded.

* * * * *